(12) United States Patent
McMinn

(10) Patent No.: US 8,072,088 B2
(45) Date of Patent: Dec. 6, 2011

(54) FLUID POWER GENERATOR FOR EXTRACTING ENERGY FROM A FLUID FLOW

(76) Inventor: Derek James Wallace McMinn, West Midlands (GB)

( * ) Notice: Subject to any disclaimer, the term of this patent is extended or adjusted under 35 U.S.C. 154(b) by 0 days.

(21) Appl. No.: 12/673,297

(22) PCT Filed: Sep. 2, 2009

(86) PCT No.: PCT/GB2009/002112
§ 371 (c)(1),
(2), (4) Date: Feb. 12, 2010

(87) PCT Pub. No.: WO2010/026374
PCT Pub. Date: Mar. 11, 2010

(65) Prior Publication Data
US 2010/0295312 A1    Nov. 25, 2010

(30) Foreign Application Priority Data
Sep. 5, 2008   (GB) .................................. 0816218.2

(51) Int. Cl.
*F03B 13/10* (2006.01)
(52) U.S. Cl. ............................................. 290/53; 60/398
(58) Field of Classification Search .................. 290/43, 290/53–54; 60/398, 325, 671; 417/100
See application file for complete search history.

(56) References Cited

U.S. PATENT DOCUMENTS

| | | | | | |
|---|---|---|---|---|---|
| 4,013,379 | A | * | 3/1977 | Bolding | 417/100 |
| 4,018,051 | A | * | 4/1977 | Gay | 60/398 |
| 4,078,871 | A | * | 3/1978 | Perkins, Jr. | 417/100 |
| 4,141,670 | A | * | 2/1979 | Russell | 415/3.1 |
| 4,466,244 | A | * | 8/1984 | Wu | 60/398 |
| 5,222,833 | A | * | 6/1993 | Gorlov | 405/76 |
| 5,507,943 | A | * | 4/1996 | Labrador | 210/136 |
| 5,584,179 | A | * | 12/1996 | Isa | 60/370 |
| 7,611,325 | B2 | * | 11/2009 | Caldwell | 415/4.1 |
| 7,834,475 | B1 | * | 11/2010 | Costas | 290/53 |
| 2009/0102199 | A1 | * | 4/2009 | Voropaev | 290/53 |

FOREIGN PATENT DOCUMENTS

| | | |
|---|---|---|
| EP | 0948716 B1 | 1/2006 |
| FR | 2 506 394 | 11/1982 |
| GB | 2 250 321 | 6/1992 |

OTHER PUBLICATIONS

UKIPO Search Report for UK Patent Application No. 0816218.2, dated Jan. 12, 2009.
UKIPO Examination Report for UK Patent Application No. 0816218.2, dated Jun. 3, 2009.
Response to UKIPO Examination Report for UK Patent Application No. 0816218.2, dated Jul. 2, 2009.
UKIPO Communication for Response to Examination Report for UK Patent Application No. 0816218.2, dated Jul. 12, 2009.

* cited by examiner

*Primary Examiner* — Michael Zarroli
(74) *Attorney, Agent, or Firm* — Bingham McCutchen LLP

(57) ABSTRACT

The invention provides a device for extracting energy from a fluid flow. The device has an air compression chamber and an array of valves, operable to open and close to regulate flow of the fluid through associated valve apertures. The valves are operable to close progressively as the fluid flow is incident thereon, thereby focusing flow of the liquid towards the air compression chamber and compressing air therein. The valves also open on a return flow of liquid from the compression chamber.

20 Claims, 5 Drawing Sheets

FLUID POWER GENERATOR FOR EXTRACTING ENERGY FROM A FLUID FLOW

RELATED APPLICATIONS

This application is a U.S. National Stage of International Application Serial No. PCT/GB2009/002112, filed Sep. 2, 2009, and claims priority to United Kingdom Patent Application No. 0816218.2, filed Sep. 5, 2008, the disclosures of which are hereby incorporated by reference in their entireties.

TECHNICAL FIELD

The present invention relates to a device for extracting energy from a fluid flow, and more particularly to a fluid power generator generating air pressure variations that may be used to drive an air turbine.

BACKGROUND

Recent years have seen the interest in the development of renewable energy sources increase as concern over the impact of carbon emissions on the environment has been heightened. Whilst focus has been primarily on the development of wind and solar power, these technologies have various disadvantages. Wind power generation is reliant upon the presence of driving wind of a given threshold value to move the propeller at sufficient speed to drive a turbine. Wind power also requires a large area of land dedicated to the production of energy and these large 'wind farms' are often unsightly and may pose a hazard to the surrounding wildlife. Solar power also has the disadvantages of providing a non-reliable source of electricity and also suffers from low efficiency and high cost.

Wave or tidal energy devices can overcome many of the disadvantages listed above. They provide a reliable source of energy as they are driven by the force inherent within tidal and ocean waves and also have the potential to be placed in a large number of areas, particularly in coastal areas with large fetch, such as the western coast of Europe.

A number of differing techniques have been employed to harness wave, tidal or ocean power. Traditional tidal energy devices have centred on a barrier arrangement that when placed within a tidal system fills with water at high tide and releases the water at low tide through a turbine to generate electricity. Concerns have been raised that the use of conventional barrier type tidal energy devices can prove hazardous to wildlife and boats. Additionally, these devices may only be used after each high tide and do not therefore provide a constant supply of energy.

One example of a wave energy collector is disclosed within EP 1115976. This device utilises the relative rotational movement between pluralities of segments to drive a hydraulic motor.

One alternative technique is to use the oscillatory nature of waves to compress a volume of air (an Oscillating Water Column device). By submerging a structure with an air chamber and an underwater aperture, an incident surface wave makes the fluid level within the chamber rise, compressing the volume of air within the air chamber. This (adiabatically) compressed air may then be used to drive a turbine, the rotation of which may be used to power a generator. As the water level falls, the air pressure reduces and air is drawn back into the chamber through the turbine. An example of this type of device is shown within EP 0948716 whereby the parabolic wave is focussed into a chamber wherein the air is compressed and used to drive a unidirectional turbine. Another example of an Oscillating Water Column device has been developed by Wavegen and has been named the 'Limpet'.

One inherent problem of these devices is the relatively low energy conversion efficiency, coupled to the varying nature of the size and strength of the incident waves, which leads to an uncertain energy output. These devices are also located on or close to the shore to take advantage of the higher parabolic waves at the shore. This again leads to a variation in the production of energy between high and low tides. Additionally, the above devices focus parabolic ocean waves through structural features, for example an upwardly sloped base or a generally upright wall. These devices are also unsuitable in scenarios of constant flow or current, for example tidal flows; thermohaline induced oceanic currents, for example the North Atlantic Drift and the Gulf Stream; and gravity induced fluid flows, for example within rivers.

SUMMARY

The present invention aims to overcome these problems by providing an improved device for extracting energy from a fluid flow.

It is a further aim of the present invention to provide an improved water power generator. It is a further aim of the present invention to provide a water power device that requires little maintenance.

According to the present invention there is provided a device for extracting energy from a fluid flow. The device comprises an air compression chamber and an array of valves, operable to open and close to regulate flow of the fluid through associated valve apertures. The valves are operable to close progressively as the fluid flow is incident thereon, thereby focusing flow of the liquid towards the air compression chamber and compressing air therein, and to open on a return flow of liquid from the compression chamber.

It is an advantage that the device is configured to focus the energy in a flow of liquid to compress the air in an air compression chamber. The device is configured so that this can occur in a cyclical manner. The progressive closing of the valves focuses the flow of fluid to compress the air in the air compression chamber. The liquid, which then flows back out of the air compression chamber, is allowed to flow through the apertures by the opening of the valves. Another compression cycle can then commence by the progressive closing of the valves. Accordingly the device may be used in any flowing liquid, such as a river, or tidal flow or ocean current, to extract energy in the form of compressed air.

Embodiments of the invention may further comprise an accumulation chamber for storing compressed air that has been compressed in the air compression chamber.

Advantageously, the device may further comprise a turbine operable to be driven by the compressed air. A decompression chamber may be positioned downstream of the turbine for enhancing a pressure differential across the turbine during the return flow of liquid from the compression chamber.

In embodiments of the invention, the valves within the array extend in an upward gradient in the direction of the fluid flow.

The valves may be flap valves. These flap valves may comprise respective buoyant elements. The buoyant elements may have an angular displacement required to close the flap valves, the angular displacement increasing up the gradient. The buoyancy of the buoyant elements may also increase up the gradient and the buoyant elements may comprise tires.

In embodiments of the invention the valves comprise spoiler elements to facilitate the deflection of the fluid flow along the upwardly inclined gradient and/or assist the opening of the valves during the return flow.

Further embodiments comprise a stabilizer or tether means for holding the device at a predetermined position. This stabilizer may take the form of an anchor, mooring ropes, chain or any other anchorage.

Further embodiments comprise a stabiliser or tether means for holding the device at a predetermined position. This stabiliser may take the form of an anchor, mooring ropes, chains or any other anchorage.

Embodiments of the invention further comprise use of the device as a tidal energy device, to drive a water turbine or to pump water to a higher reservoir. Additional embodiments comprise the use of the device as an oceanic or river flow device In final embodiments, multiple devices may be arranged or linked together to form a network of devices positioned to optimise utilisation of the fluid flow.

BRIEF DESCRIPTION OF THE DRAWINGS

The invention will now be described, by way of example, with reference to the accompanying drawings, in which.

DETAILED DESCRIPTION

Figure 1:
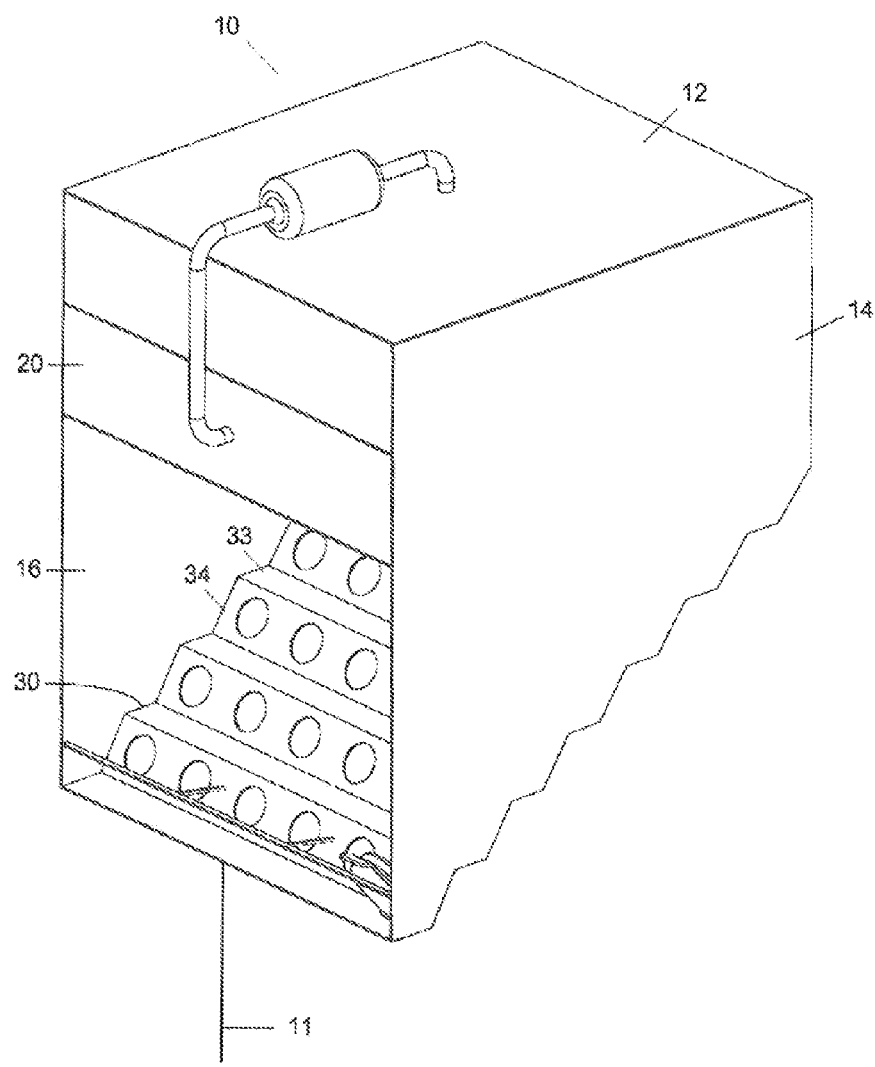
FIG. 1 is a perspective view of a device for extracting energy from a fluid flow, prior to submersion in the fluid.

FIG. 1 shows a simplified perspective view of a device 10 for extracting energy from a liquid flow. The device comprises a roof 12, and side walls 14 that form an opening 16 incident to the flow direction. A top portion 20 of the device 10, below the roof 12, houses an arrangement of air chambers, as will be described in more detail below. The roof 12, side walls 14 and additional structural components may be constructed from concrete, although any material capable of producing a stable, water-tight structure may be utilised, for example metals, including steel. A base section 30 extends from the bottom edge of the opening 16, and this will be described in more detail below. The size of the device may be optimised for efficiency and/or to optimise the capture of the fluid and may be based on characteristics of the incident flow, as will be further described below.

Figure 2:
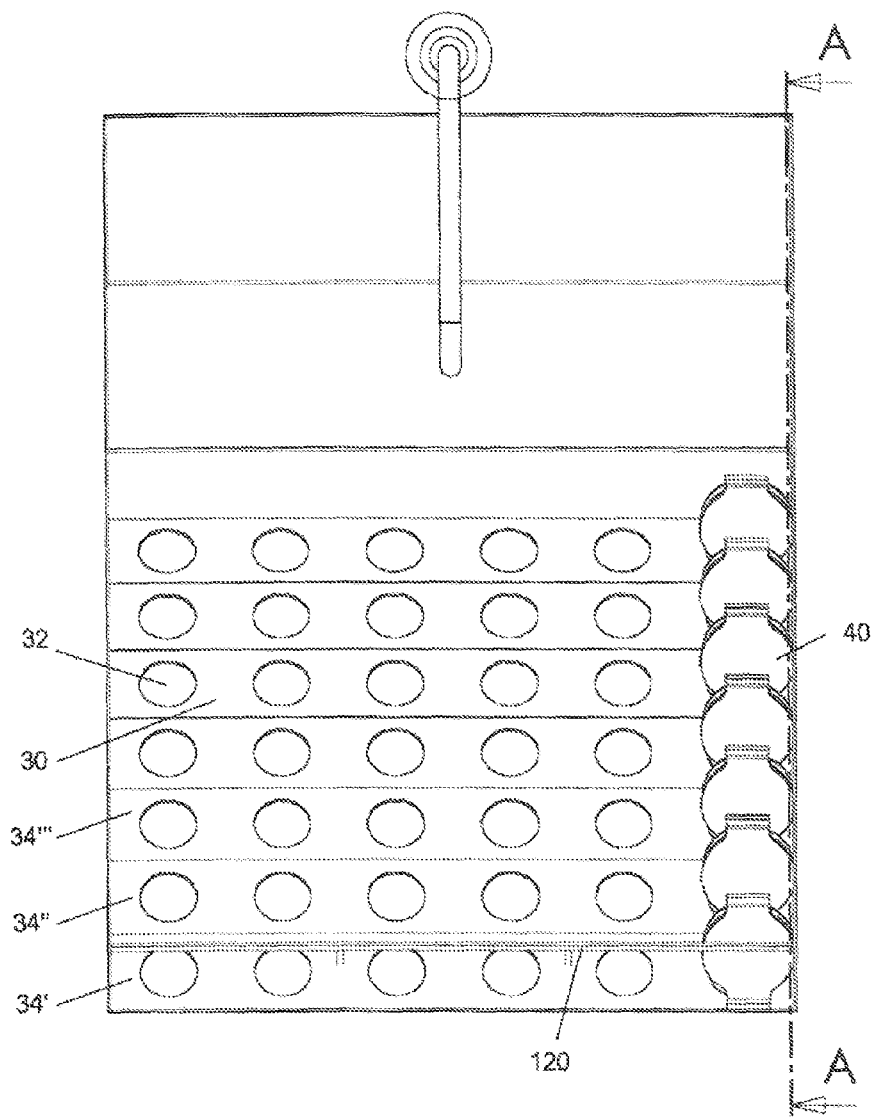
FIG. 2 is an end-on view of the device of FIG. 1, showing the array of cutaways and valves in detail.

The base section 30 of the device 10 comprises alternate sloping backwalls 34 and horizontal floors 33. FIG. 2 shows an end-on view of the device looking through the opening 16. An array of apertures 32 on the backwalls 34 are covered by a corresponding array of valves 40 (of which only one column of the array is shown in FIG. 2). Additionally, although the array of apertures 32 is shown with a 6×7 arrangement, it may be appreciated that the number of rows and columns of the array may be varied dependent upon the required focussing effect and size of the device. For example, to utilise oceanic or tidal currents the device 10 may feature an array with as many as 200 or more columns and 2000 or more rows. Additionally, multiple devices 10 may be connected together to form a larger structure.

To simplify the figures and allow viewing of the apertures 32, only one column of valves 40 is shown in each figure. The valves 40 are shown as flap valves; however it may be appreciated that other valve types may be employed. The structure of the flap valves 40 is explained in detail below with reference to FIGS. 3-5. The purpose of these valves 40 is to channel and regulate the flow of liquid in a manner that will be described in greater detail below. The columns of the valves 40 are shown extending along an upwardly extending gradient in the direction of liquid flow so that each row of valves is located both above and behind the lower row. Although the array is shown with a stepped arrangement, any configuration that provides an upwardly extending gradient may be employed, depending upon the orientation of the device with respect to the incident liquid flow or the required liquid channelling.

Figure 3:
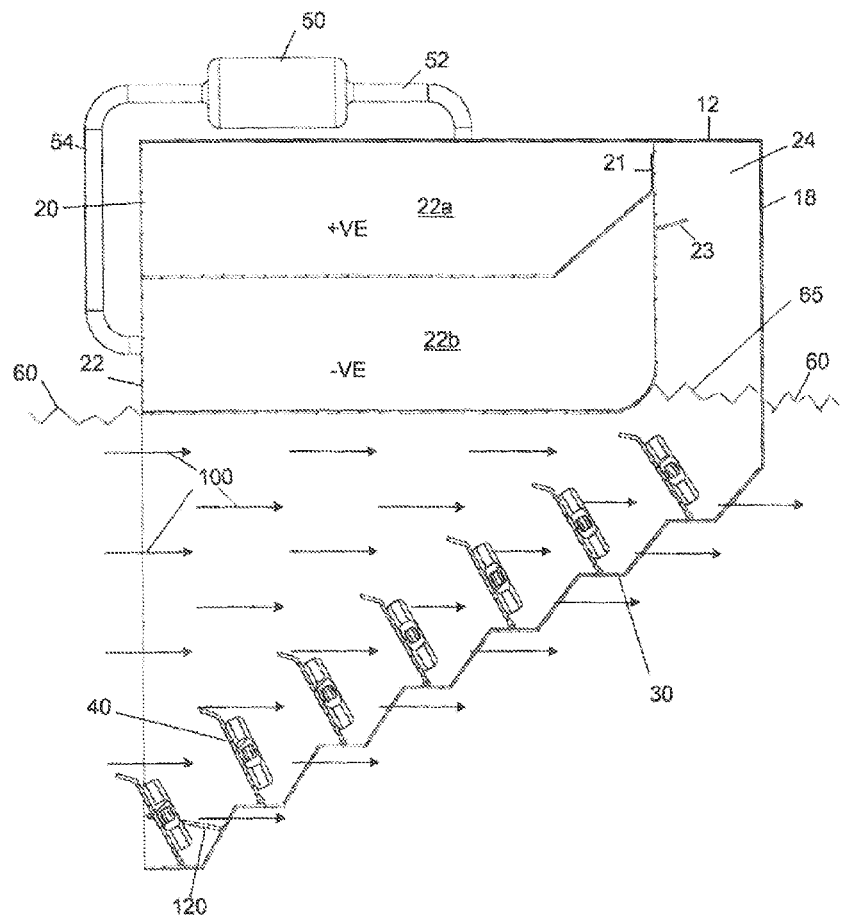
FIG. 3 is a cross-sectional view through the line A-A in FIG. 2 after submersion into the fluid flow.

FIG. 3 shows a cross-sectional view through the line A-A marked within FIG. 2. In this figure, the device has been immersed into a liquid to a level 60. The valves 40 are open and the level of the liquid 65 within the device is approximately the same as the external level 60. The top portion 20 includes an air compression chamber 24, which is open at its bottom so that the liquid level 65 traps the air inside it, an accumulator chamber 22a, and a decompression chamber 22b. The pressure of the air trapped within the compression chamber 24 between the roof 12, side walls 14, rear wall 18, chambers 22a, 22b and the liquid 65 is also approximately the same as the external air pressure. It may be appreciated that the area and volume of the space 24 may vary depending upon the relative dimensions of the constricting components (12, 14, 18, 20, 22) and the height of the water level 65.

Within the embodiment shown, the two chambers 20, 22 are connected to the roof 12 and sidewalls 14 of the device 10. These chambers act to store air of differing pressure and are connected to each other via a turbine 50 and piping 52, 54. Flap valves 21, 23 interconnect the compression chamber with, respectively, each of the accumulator chamber 22a, and the decompression chamber 22b. As the pressure of the air within the compression chamber 24 becomes higher than the pressure in the chamber 22a, the valve 21 is forced open by the air pressure until the pressure within the chamber 22a and the compression chamber 24 are equivalent. Conversely, if the pressure within the chamber 22b is greater than the pressure in the compression chamber 24, then the valve 23 opens until the pressures are equivalent. These chambers 22a, 22b also act as buoyancy tanks to keep the device floating within the water. As shown in FIG. 1, tether means 11 may be employed to secure the device 10 into position and allow the device to face the incident liquid flow. This tether means 11 may take the form of an anchor, mooring ropes, chains or any other anchorage.

The operation of the device will now be described in relation to FIGS. 3, 4 and 5. Flow lines are shown for reference only. FIG. 3 shows the device in the relaxed or initial position. In this position, the valves 40 are open, the water levels 60, 65 are approximately level and the pressure of the air within the compression chamber 24 and outside the device are approximately equivalent. An incident flowing liquid or current, represented by the individual flow lines 100 and incident upon the device 10, flows through the aperture 16 and acts upon the array of valves 40. The flowing liquid 100 enters the device and acts upon the valves 40. The valves are arranged so that lowermost row of valves, due to the impulse of the liquid flow 100, is the first to close against the apertures 32. Once a valve 40 has closed, the incident liquid flow 100 is deflected in an upwards direction, increasing the impulse of the liquid flow against the second row of valves that are then also closed by the force of the flow 100. This progressive closing of the valves focuses the flow of the liquid (represented in the figures by the lines of flow 100) into the compression chamber 24, causing the water level 65 within the to rise, and compressing the air within the chamber 24. This process continues until all the valves 40 are fully closed (FIG. 5). Returning to an intermediate situation (FIG. 4) where (in this representation) 3 of the 7 rows of valves are closed, it is clear that the fluid level 65 within the compression chamber 24 of the device 10 has increased to a level above the external mean level 60. This increases the air pressure within the compression chamber 24, closing the valve(s) 23 between the compression chamber 24 and the decompression chamber 22b and opening the valve 21 between the compression chamber 24 and the accumulator chamber 22a.

Figure 4:
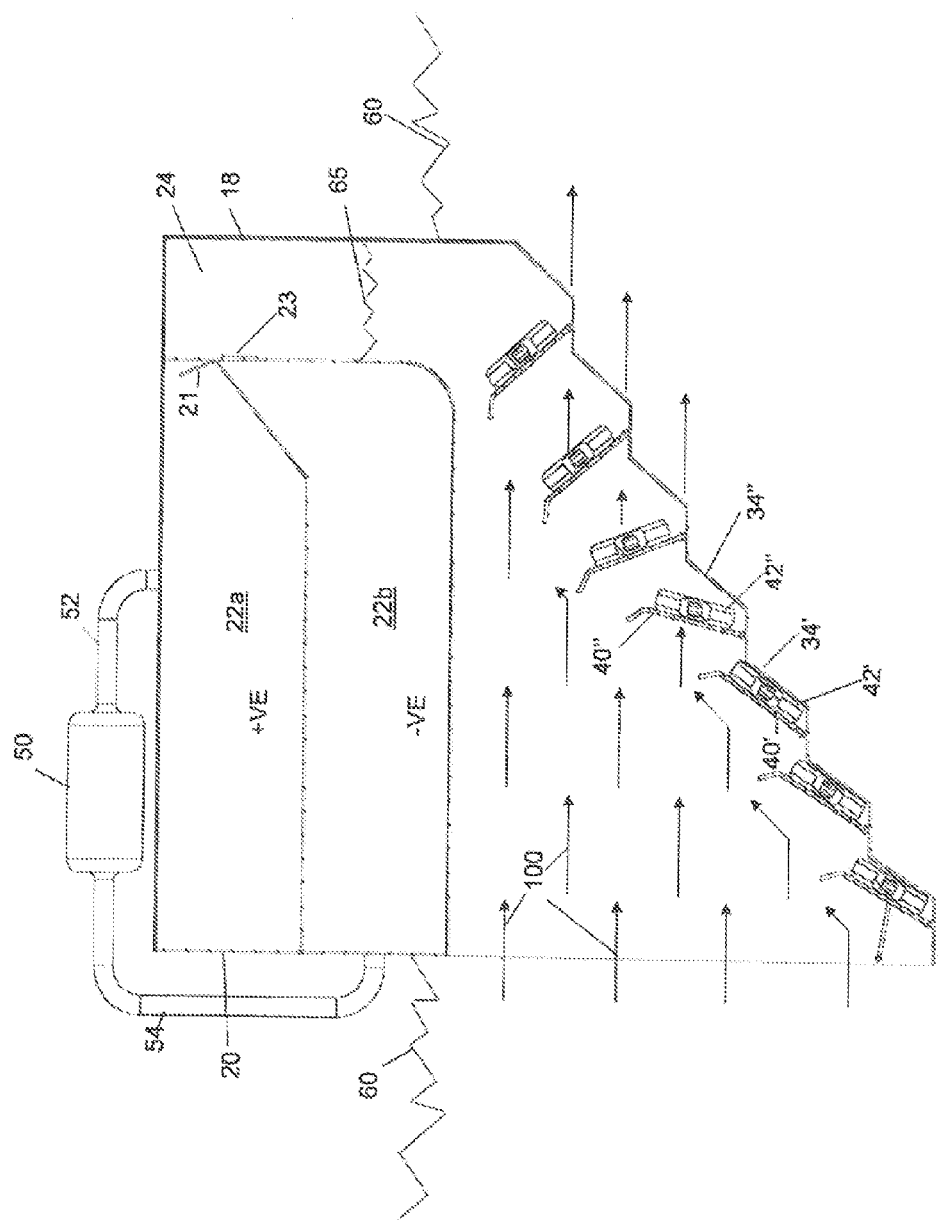
FIG. 4 is a cross-sectional view as per FIG. 3 and shows the partial closure of the valves due to the incident fluid flow.
Figure 5:
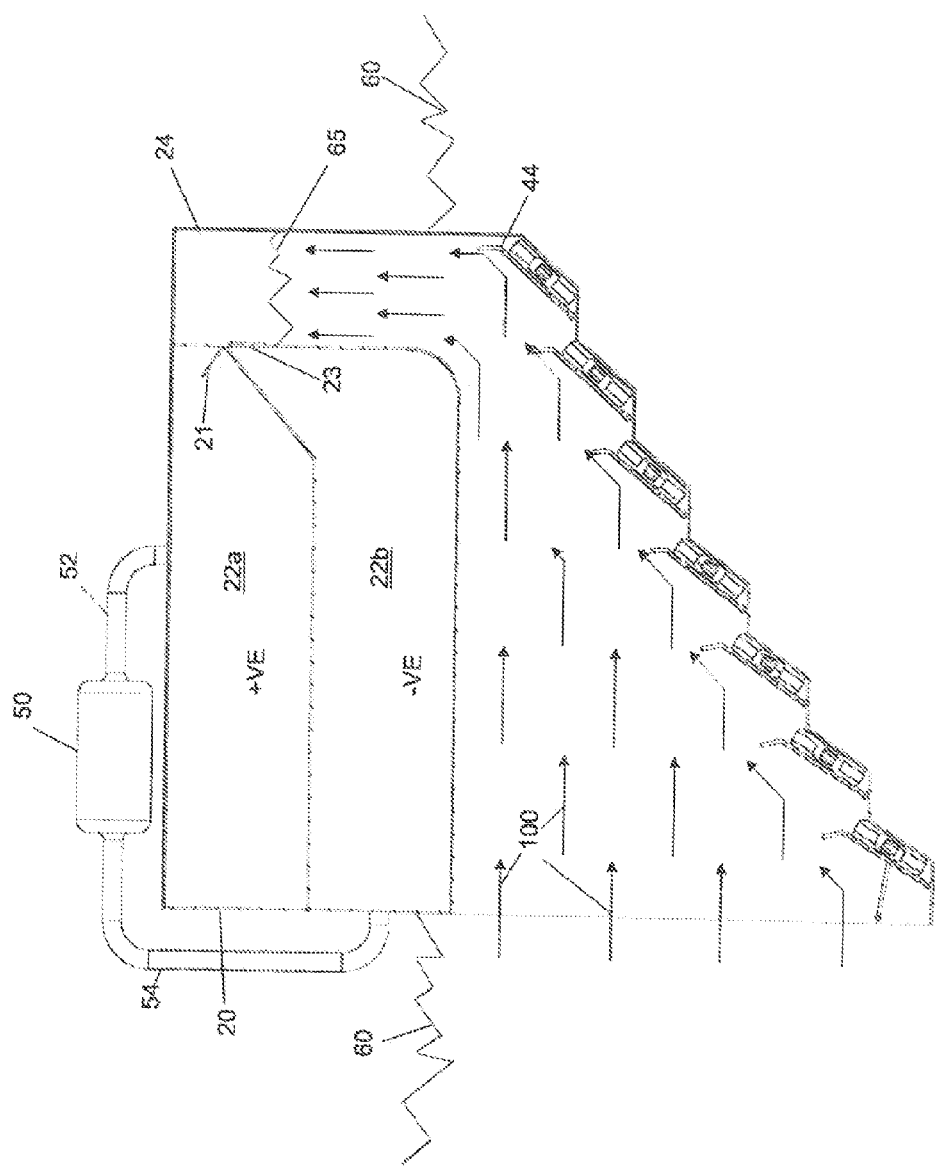
FIG. 5 is a cross-sectional view as per FIGS. 3 and 4 and shows the complete closure of the valves due to the incident fluid flow, and the subsequent upsurge of fluid into the compression space.

As may be seen from FIG. 4, the valves 40 close sequentially along the upwardly inclined gradient of the valve array. This sequential closing is achieved by varying the buoyancy and angle of closure for the valves between the rows within the array. In this case, the lower valves have lower buoyancy than the valves within the row directly above. In the current embodiment, the valves comprise car tires 42 of differing tire pressure. Additionally, the angle of the backwall 34 with respect to the vertical increases along the upward gradient towards the compression space 24. Valve 40' has a tire 42' with a lower pressure and smaller angle between the backwall 34' and the vertical than valve 40", with tire pressure 42" and backwall 34".

FIG. 5 shows the end state of the device when all the valves 40 are fully closed. The progressive closing of the valves 40 results in an increase in the level of the water 65 within the compression chamber 24. The degree of water level 65 increase is dependent upon the number of valves 40 and the impulse of the incident fluid. Although the present embodiment features seven rows of valves, any number of rows may be utilised dependent upon the depth of the fluid and the degree of surge required. The incident flow of the fluid is now concentrated and directed towards the compression chamber 24 (as shown by the lines of flow 100), the volume of which has been reduced by the increasing water level 65. This reduction in volume creates a corresponding increase in the air pressure within the compression chamber 24 and the accumulator chamber 22a.

Once the upward surge of water reaches a maximum, the air pressure within the compression chamber 24 rapidly drops and the inlet valve 21 to the accumulator chamber 22a closes. At this point there is no net fluid flow within the device 10. When the device 10 is in this no-flow equilibrium position, both valves 21 and 23 between the compression chamber 24 and the chambers 22a, 22b are closed. Due to the operation of the valves 21, 23 and the relative air pressures of the chamber 24 at varying stages of the operation of the device 10, the two chambers 22a, 22b have differing air pressures. Within the embodiment shown, accumulator chamber 22a has a greater air pressure than decompression chamber 22b.

The two chambers 22a, 22b are linked by a turbine 50 and inlet and outlet couplings 52, 54. By opening the inlet 52 and outlet 54 couplings to the turbine 50, the positive pressure air in accumulator chamber 20 is drawn through the coupling 52, due to the pressure differential between the two bodies of air, into the turbine 50 and through coupling 54 into the decompression chamber 22. This process drives the turbine 50 and may be used for the generation of electricity via a generator (not shown). Due to the construction of the chambers 22a, 22b and the method of coupling to the turbine 50, the chambers may be used to store the varying pressured air over a number of cycles of the oscillatory water level 65, building up the pressure difference with each cycle. Once a threshold pressure difference is reached, the coupling to the turbine 50 may be opened and the air moved through the turbine 50.

When the device 10 is in the no-flow position the water pressure acting upon the front of the valves 40 is the same as the rear of the valves. The valves therefore begin to open due to the buoyancy of the tires. As the valve closest to the compression space has the highest pressure or buoyancy, this valve opens first. The water level 65 then begins to fall, causing a backward or downward flow of water over the valves. Due to the spoilers 44 on the top of the valves, the downward force of the water acts to open the valves, until all the valves are open, resetting the device to the situation shown in FIG. 3. A rail 120 or any other means may be utilised to prevent the valves 40 from opening past a predetermined angle. The device 10 is therefore essentially reset and the process described above is repeated (i.e. the incident fluid flow acts upon, and begins to close, the array of valves).

As an alternative to the unidirectional turbine 50 described above, the chambers 22a and 22b could be omitted and a bidirectional flow turbine connected directly to the compression chamber 24, for example a Wells turbine that is able to rotate in the same direction irrespective to the incident air flow direction.

Although the device 10 has been explained with reference to a single device operating in isolation, it may be envisaged that multiple devices may be linked or placed together to form a cellular network of devices capable of supplying a larger quantity of energy. These devices may act independently or may share common elements, for example air compression and decompression chambers and/or turbines and generators to maximise the efficiency of the devices. Additionally, in order to maximise the flow of fluid through the devices, the network may be arranged into a "U" or "V" shape to prevent escape of the fluid flow around the outside of the network. Alternatively, the devices may be arranged within a shape akin to that of a "stealth bomber", creating an area of low liquid pressure behind the structure. Multiple networks may also be linked or arranged together to optimise utilisation of fluid flow depending upon flow conditions. Although the networks of devices have been described in the orientation described above, any orientation may be utilised to suit the particular flow conditions. In addition, the devices may be arranged in series or stacked to increase the amount of energy that is extracted. The number of devices in the stack may be selected to optimise the return in terms of energy extracted in relation to the construction cost. Also, the stacks may be arranged as a series of devices oriented to receive a flow in one direction, with another series oriented to receive flow in the reverse direction. This arrangement is particularly suitable for use in tidal flows and avoids having to turn the devices around when the tide changes direction.

What is claimed is:

1. A device for extracting energy from a liquid flow, the device comprising:
    an air compression chamber;
    a turbine operable to be driven by air compressed in the air compression chamber;
    a decompression chamber positioned downstream of the turbine; and
    an array of valves, operable to open and close to regulate flow of the liquid through associated valve apertures,
    wherein the valves are operable to close progressively as the liquid flow is incident thereon, thereby focusing flow of the liquid towards the air compression chamber and compressing air therein, and to open on a return flow of liquid from the compression chamber, and wherein the decompression chamber enhances a pressure differential across the turbine during said return flow of liquid from the compression chamber.

2. A device according to claim 1 further comprising an accumulation chamber for storing compressed air compressed in the air compression chamber.

3. A device according to claim 1, wherein the valves within the array extend in an upward gradient in a direction of the liquid flow.

4. A device according to claim 3, wherein the valves within the array are flap valves.

5. A device according to claim 4, wherein the flap valves comprise respective buoyant elements.

6. A device according to claim 5, wherein the buoyant elements have an angular displacement required to close the flap valves, the angular displacement increasing up the gradient.

7. A device according to claim 5, wherein the buoyancy of the buoyant elements increases up the gradient.

8. A device according to claim 5, wherein the buoyant elements comprise tires.

9. A device according to claim 5, wherein the valves comprise spoiler elements to facilitate deflection of the liquid flow along the upward gradient and/or to assist opening of the valves during the return flow.

10. A device according to claim 1 further comprising a stabilizer for holding the device at a predetermined position.

11. A device according to claim 1, wherein the liquid flow is at least one of a tidal liquid flow, a river liquid flow, or an oceanic liquid flow.

12. A device according to claim 1, wherein the device drives a water turbine.

13. A device according to claim 1, wherein the device pumps water to a higher reservoir.

14. A device according to claim 1, wherein multiple devices are arranged or linked together to form a network of devices.

15. A device for extracting energy from a liquid flow, the device comprising:
   an air compression chamber; and
   an array of flap valves comprising respective buoyant elements, extending in an upward gradient in the direction of the liquid flow, operable to open and close to regulate flow of the liquid through associated valve apertures,
   wherein the valves are operable to close progressively as the liquid flow is incident thereon, thereby focusing flow of the liquid towards the air compression chamber and compressing air therein, and to open on a return flow of liquid from the compression chamber.

16. A device according to claim 15 further comprising an accumulation chamber for storing compressed air compressed in said air compression chamber.

17. A device according to claim 15, wherein the buoyancy of the buoyant elements increases up the gradient.

18. A device according to claim 15, wherein the valves comprise spoiler elements to facilitate deflection of the liquid flow along the upward gradient and/or to assist the opening of the valves during said return flow.

19. A device according to claim 15, wherein the buoyant elements have an angular displacement required to close the flap valves, the angular displacement increasing up the gradient.

20. A device for extracting energy from a liquid flow, the device comprising:
   an air compression chamber;
   an accumulation chamber that stores compressed air from the air compression chamber; and
   flap valves in an array slanting upward in the direction of the liquid flow, operable to open and close to regulate flow of the liquid through associated valve apertures, the valves comprising buoyant elements,
   wherein the valves are operable to close progressively, starting from an inlet of the device, as the liquid flow is incident on the device, thereby focusing flow of the liquid towards the air compression chamber and compressing air therein, and to open on a return flow of liquid from the compression chamber.

* * * * *